(No Model.)
S. FULLER.
WHEEL HOE.
No. 324,466. Patented Aug. 18, 1885.
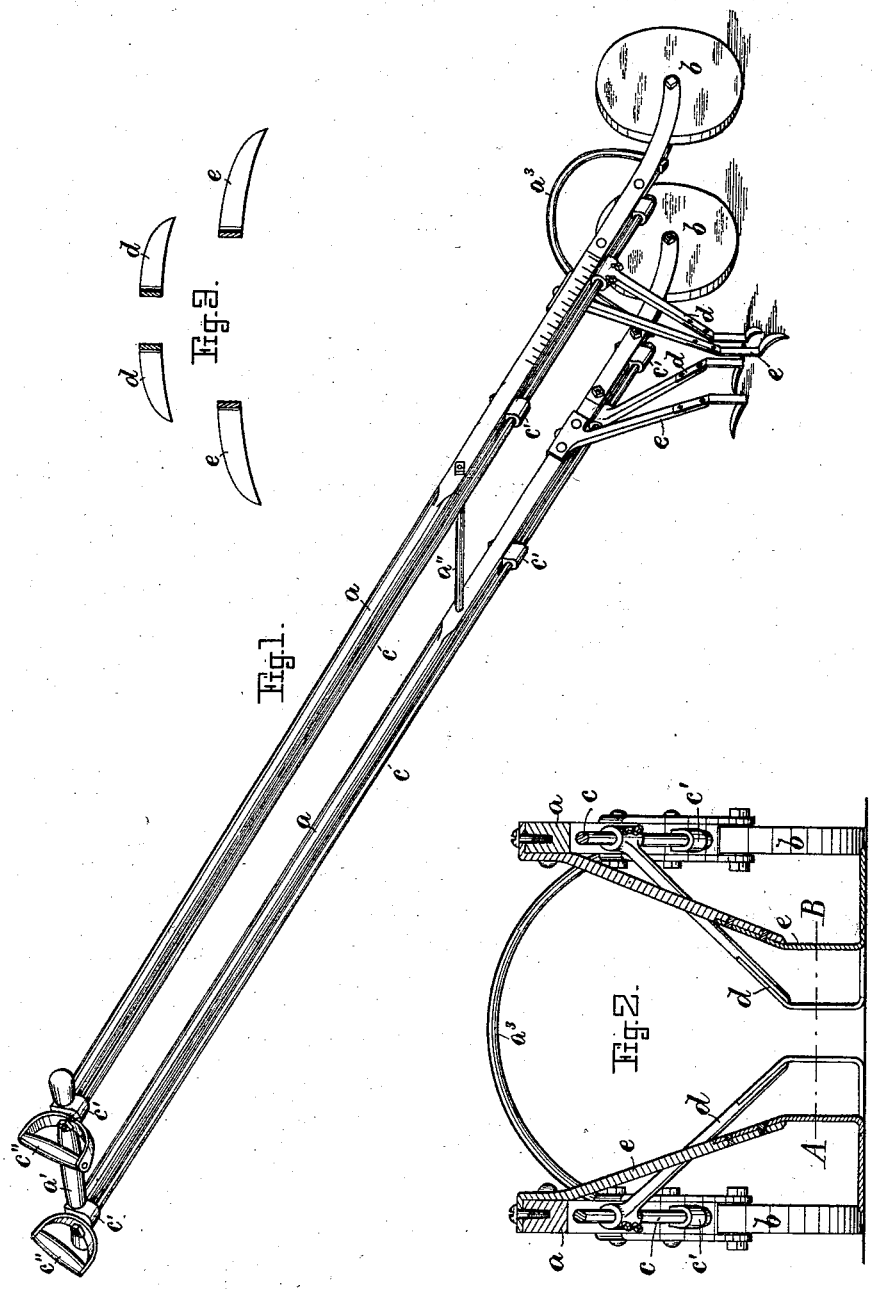
Witnesses
Henry Chadbourne.
Sarah M. Goodrich.
Inventor
Solomon Fuller
by Alban Andrén. his atty.

United States Patent Office.

SOLOMON FULLER, OF DANVERS, MASSACHUSETTS, ASSIGNOR TO WILLIAM M. CURRIER, OF SAME PLACE, CHARLOTTE J. BOWKER, OF BOSTON, AND JAMES J. H. GREGORY, OF MARBLEHEAD, MASSACHUSETTS.

WHEEL-HOE.

SPECIFICATION forming part of Letters Patent No. 324,466, dated August 18, 1885.

Application filed November 24, 1884. (No model.)

*To all whom it may concern:*

Be it known that I, SOLOMON FULLER, a citizen of the United States, residing at Danvers, in the county of Essex and State of Massachusetts, have invented certain new and useful Improvements in Wheel-Hoes; and I do hereby declare that the same are fully described in the following specification, and illustrated in the accompanying drawings.

This invention relates to improvements upon the patent granted to me for wheel-hoes May 6, 1884, No. 298,296, and it is carried out as follows, reference being had to the accompanying drawings, where—

Figure 1 represents a perspective view of the improved wheel-hoe. Fig. 2 represents a cross-section over the stationary weeders, and Fig. 3 represents a section on the line A B, shown in Fig. 2.

Similar letters refer to similar parts wherever they occur on the different parts of the drawings.

My present invention is similar to the one described and shown in my previous patent, No. 298,296, in that it has a frame or a pair of bars, $a\,a$, secured together at a proper distance apart by means of upper brace or stay, $a'$, one or more braces, $a''$, and lower arched brace, $a^3$. To the front ends of the bars $a\,a$ are journaled the wheels $b\,b$, and bearings $c'\,c'\,c'$ are secured to bars $a\,a$, in which are located the rods $c\,c$, adapted to be turned in said bearings, and provided in their upper ends with handles $c''\,c''$, by means of which the machine is guided, as well as the rods $c\,c$ rocked in their bearings. At or near the lower ends of the rods $c\,c$ are secured the respective weeders $d\,d$, which are bent, curved, or otherwise shaped to suit the requirements of the soil and plants for which they may be used, in a manner as shown and described in my patent above mentioned. These weeders $d\,d$ are movable to and from each other by means of the handles $c''\,c''$, so as to bring the said weeders under the perfect control of the operator, for the purpose as set forth in my former patent; but as it is important that the whole space between each successive row of plants should be thoroughly weeded out, I carry out my improvement as follows: In addition to the movable weeders $d\,d$, I secure to the bars $a\,a$, or to any other stationary part of the machine, a pair of stationary weeders, $e\,e$, the lower ends of which are bent, curved, or otherwise shaped to perform the work properly. Such stationary weeders $e\,e$ may be secured to the bars $a\,a$ or other parts by means of screws, rivets, bolts, or in any other well-known or equivalent manner, and I prefer to secure them back of the movable weeders $d\,d$, as shown, although, if so desired, they may be arranged in front or at the side of the movable weeders without departing from the essence of my invention.

In practice I prefer to so locate the stationary weeders $e\,e$ in such a manner relative to the adjustable weeders $d\,d$ that the inside cutting-edges of the stationary weeders $e\,e$ shall project a little inside of the outer cutting-edges of the movable weeders $d\,d$ when the latter are in or near their closest positions, as shown in Fig. 3, so as not to leave any unweeded surface between the said respective movable and stationary weeders; but I do not wish to confine myself to any such precise arrangement, as it may be varied to suit requirements. The stationary weeders $e\,e$ may be made to extend outwardly a suitable distance, according to the width between the rows of plants or vegetables that are to be weeded; and if such width should vary considerably for different kinds of vegetables I may so modify my present invention as to make the stationary weeders laterally adjustable and secure them firmly in place when the machine is to be used. By this my improvement I am able at one operation to weed half the space, or more, on each side of the vegetables, and by weeding successive rows it will be seen that the whole space between the vegetables becomes thoroughly weeded without the need of any subsequent weeding by hand or by means of other machinery.

Having thus fully described the nature, construction, and operation of my invention, I wish to secure by Letters Patent, and claim—

In a wheel-hoe, the wheeled frame and its laterally adjustable and movable weeders $d\ d$, adapted to be moved to or from each other while the hoe is being propelled, in combination with the stationary weeders $e\ e$, as and for the purpose set forth and described.

In testimony whereof I have affixed my signature in presence of two witnesses.

SOLOMON FULLER.

Witnesses:
 ODA HOWE,
 ALDEN P. WHITE.